United States Patent [19]
Scheurich

[11] Patent Number: 5,848,266
[45] Date of Patent: *Dec. 8, 1998

[54] DYNAMIC DATA RATE ADJUSTMENT TO MAINTAIN THROUGHPUT OF A TIME VARYING SIGNAL

[75] Inventor: Christoph Scheurich, Santa Cruz, Calif.

[73] Assignee: Intel Corporation, Santa Clara, Calif.

[*] Notice: This patent issued on a continued prosecution application filed under 37 CFR 1.53(d), and is subject to the twenty year patent term provisions of 35 U.S.C. 154(a)(2).

[21] Appl. No.: 667,072

[22] Filed: Jun. 20, 1996

[51] Int. Cl.$^6$ .............................. G06F 1/08; G06F 13/14
[52] U.S. Cl. ........................ 395/558; 370/468; 370/517; 395/200.63
[58] Field of Search ................................ 395/500, 509, 395/128, 512, 129, 200.57, 200.61, 510, 200.38; 340/825.44, 825.31; 348/107, 155, 390, 559, 154; 370/503, 535, 517; 382/239; 364/DIG. 1, DIG. 2

[56] References Cited

U.S. PATENT DOCUMENTS

| | | | |
|---|---|---|---|
| 4,564,915 | 1/1986 | Evans et al. | 345/186 |
| 4,759,014 | 7/1988 | Decker et al. | 370/503 |
| 5,034,811 | 7/1991 | Palm | 348/154 |
| 5,214,507 | 5/1993 | Aravind et al. | 348/390 |

OTHER PUBLICATIONS

"*Universal Serial Bus Specification*":Revision 1.0, Jan. 15, 1996, pp. 1–267, Intel Corporation.

*Primary Examiner*—Daniel H. Pan
*Attorney, Agent, or Firm*—Jeffrey S. Draeger

[57] ABSTRACT

A method and apparatus for adaptively transferring a time varying signal over a bus. According to the method, data representing the time varying signal by a specified digital representation is requested. A first number of data elements are transferred during a first time period, and an allocated bandwidth value representing a data transfer rate achieved in the transfer is then determined. The requested digital representation is subsequently adjusted according to the allocated bandwidth value. An apparatus of the present invention includes a processor and a host controller coupled to a processor bus. A source of digital values representing a time varying signal is coupled to the host controller. A memory coupled to the processor bus contains a data request routine for requesting digital values representing the time varying signal at a selected quality level. The memory also contains a data receipt routine, a plurality of data items received by the data receipt routine, a data item count, and an adjustment routine for comparing the value to an expected value determined by the selected quality level and for adjusting the selected quality level.

26 Claims, 4 Drawing Sheets

DYNAMIC DATA RATE ADJUSTMENT TO MAINTAIN THROUGHPUT OF A TIME VARYING SIGNAL

RELATED APPLICATIONS

This application is related to the copending application "A Method Of Maintaining A Minimum Level Of Data Quality While Allowing Bandwidth-Dependent Quality Enhancement" Ser. No. 08/666,244, filed Jun. 20, 1996.

FIELD OF THE INVENTION

The present invention pertains to the field of data transfer over a bus. More specifically, the present invention relates to dynamic data rate adjustment to maintain video throughput over a shared bus.

BACKGROUND

Digital systems continue to process escalating quantities of signals representing video, audio, and other time varying phenomena over limited bandwidth communication channels. Typically, such time varying signals are transferred via at least one shared signal line or processed by a component which handles signals from multiple devices. The various signal sources must compete in an environment where bandwidth is a precious commodity.

Consequently, sustaining communication of a time varying signal over the shared signal line(s) to a processing system often requires a compromise between bandwidth sharing and signal quality. That is, either the peak signal quality suffers in order to preserve adequate bandwidth for other devices, or the time varying signal unduly monopolizes the available bandwidth.

One instance where this problem arises is in transferring a continuous natural data type (i.e. motion video and/or audio) such as motion video over a bus in a computer system. Transferring motion video from a video peripheral device to a system memory requires periodic access to the bus which couples the memory to the peripheral. Depending on the desired quality level of the motion video, a substantial portion of the total bus bandwidth may be consumed by the video transfer. At times, this motion video transfer can have a deleterious effect on the performance of other devices which seek access to the bus. At other times, a portion of the available bus bandwidth may remain unused.

In some prior art systems, other devices must simply wait for access to the bus, relying on the user or the system designer to consider whether the system can adequately accommodate all bus accesses. If the bus is over-utilized, and the other devices have limited buffering capabilities or require real time access, data may be lost. Even if there is no data loss, bus over-utilization may cause noticably increased latencies for bus transactions such as input device response or network access.

Some prior art protocols, through the use of interrupt signals or other urgent bus request signals, allow a device to quickly seize bus domination from a monopolistic bus agent such as a video peripheral. These interruptions, however, often have no particular known latency or bandwidth. Thus, the video peripheral does not respond by adjusting the bandwidth it seeks to obtain. As a result, the video transfer may be inadvertently altered and the video quality degraded without input from the video peripheral.

Unfortunately, this inability to adapt to changing bus demands has dual negative impacts. First, the peak video quality is typically compromised to accommodate other devices on the bus. This reduces the likelihood of an uncontrolled interruption but also results in idle periods on the shared bus. Second, other devices are hindered in cases where it would be preferable to let the video quality suffer slightly in order to allow the other devices to access the bus.

Thus, prior signal transfer techniques tend to monopolize the bus or sacrifice peak quality. Further, such video systems do not take full advantage of the available bandwidth by dynamically adjusting data rates. In sum, since prior art systems do not dynamically adjust data rates by changing signal representation, they do not adequately address the need to sustain communication of a time varying signal through a bus with fluctuating loads.

SUMMARY

The present disclosure describes a method of adaptively transferring a time varying signal. According to this method, data representing the time varying signal by a specified digital representation is requested. A number of data elements are transferred during a data transfer period, and an allocated bandwidth value representing a data transfer rate achieved during the transfer is then determined. The requested digital representation is subsequently adjusted according to the allocated bandwidth value.

One processing system implementing a method of the present invention includes a processor and a host controller coupled to a processor bus. A source of digital values representing a time varying signal is coupled to the host controller. A memory coupled to the processor bus contains a data request routine for requesting digital values representing the time varying signal at a selected quality level. The memory also contains a data receipt routine, a plurality of data items received by the data receipt routine, a data item count, and an adjustment routine for comparing the count to an expected value determined by the selected quality level and for adjusting the selected quality level.

BRIEF DESCRIPTION OF THE FIGURES

The present invention is illustrated by way of example and not limitation in the figures of the accompanying drawings.

DETAILED DESCRIPTION

The present invention provides a method and apparatus for maintaining throughput of a time varying signal via dynamic data rate adjustment. In the following description, numerous specific details such as particular signal lines, signal types, bus protocols, and bus hardware arrangements are set forth in order to provide a more thorough understanding of the present invention. It will be appreciated, however, by one skilled in the art that the invention may be practiced without such specific details. In other instances, specific lines of code have not been shown in detail in order not to obscure the invention. Those of ordinary skill in the art, with the included functional descriptions, will be able to implement the necessary code without undue experimentation.

The present invention allows a digital representation of a time varying signal such as motion video and/or audio to be chosen according to the bandwidth available over a bus. The invention allows data to be transferred from the signal source at a high rate during periods where additional bandwidth is available while scaling back data transfer when the bus is heavily utilized. Consequently, a source of a time varying signal can remain an accommodating bus agent by allowing other devices to obtain bandwidth otherwise utilized by the signal source. The adjustable transfer rate of the present invention thus maximizes bus utilization where multiple devices compete for access to the limited bandwidth of the bus.

Figure 1:
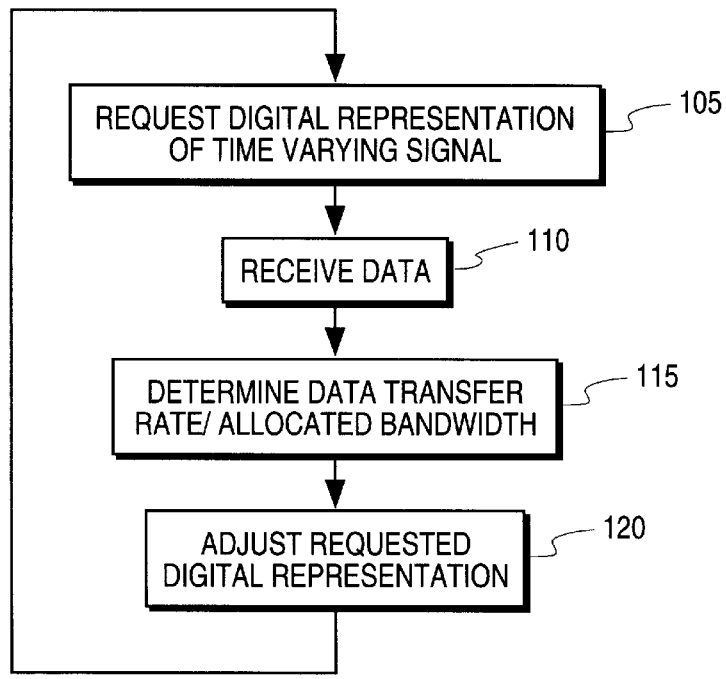
FIG. 1 is a flowchart illustrating one method of the present invention.

FIG. 1 is a flow chart illustrating one method of the present invention. This method may be executed in a computer system, video processing system, or other system which receives real time digital data such as motion video over one or more signal lines. In such a system, a requesting bus agent typically communicates with a source of a digital representation of the time varying signal. The signal may be a video, audio, or any other time varying signal which may be represented in several digital formats of varying bandwidth. The techniques of the present invention may be applied to shared or local computers buses, peripheral buses, network communication lines, and other types of shared communication resources.

In step 105, a request is made by a bus agent for a digital representation of the time varying signal. This representation can be serially transmitted or transmitted as a series of bytes, words, or other size data packets. Groups of such packets collectively form items such as video frames. The data requested may be processed as packets or as items depending on the needs of the particular system.

The requested data is received by the requesting bus agent in step 110 and subsequently stored in a system memory. The system memory may be standard system memory such as dynamic random access memory or cache memory. Alternately, the memory may be specialized memory such as a frame buffer or other type of video random access memory. The data may be stored in page sized buffers if a paging system is used, or may be stored in larger buffers such as a frame buffer. Additionally, the data may need to be processed in order to reconstruct the time varying signal from the particular digital representation used by the signal source.

Step 115 determines how much bandwidth was allocated for the data transfer. If a segment of the requested digital representation is received in an expected time period, the bandwidth allocated is sufficient to accommodate that digital representation. On the other hand, if less than the expected amount of data is received or if a longer than expected period of time is required to receive an expected quantity of data, insufficient bandwidth is allocated to transport the selected digital representation of the time varying signal.

Once it has been determined whether sufficient bandwidth is allocated, the requested digital representation is adjusted in step 120. The goal is to adapt to the bandwidth presently available on the bus. In one embodiment, a sampling rate of the time varying signal is decreased when the bus is over-utilized. For example, a more sparse sampling of pixels may be used to represent each frame of a video signal. Alternately, a data averaging technique or another well known compression technique can be used to reduce data. These techniques decrease bus bandwidth utilization at the expense of reduced signal quality and/or increased signal processing. A complementary adjustment enhances signal quality and/or reduces processing when the bus is under-utilized for a certain period of time.

After the appropriate adjustment, the next request specifies a digital representation which is optimized according to the bandwidth available on the bus. The receiving routine accommodates any change in processing required due to the new signal representation.

Figure 2:
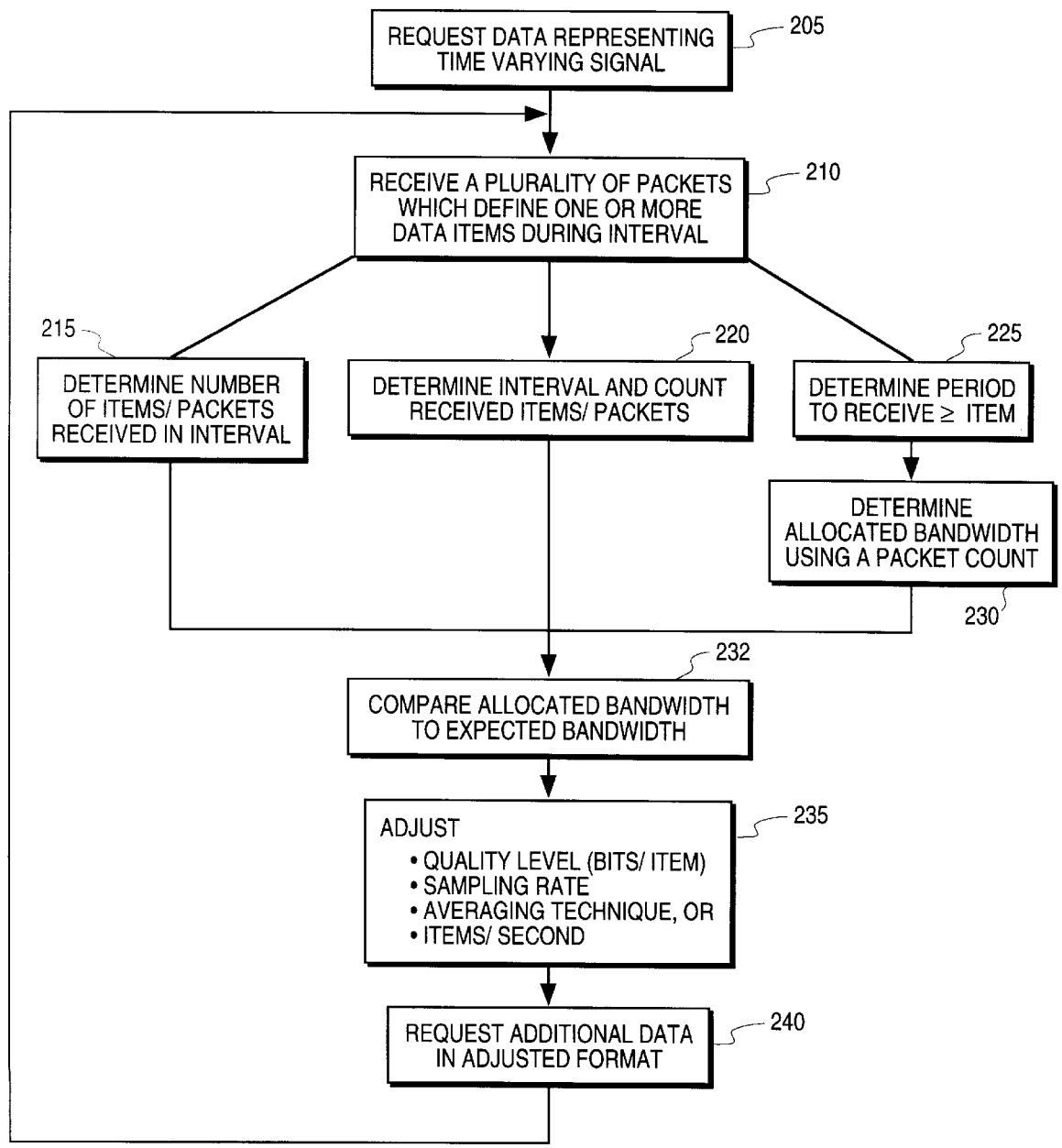
FIG. 2 is a flowchart providing additional details of the present invention.

FIG. 2 provides additional details of one method of the present invention. Similar to the method FIG. 1, a digital representation of a time varying signal is requested in step 205. The data representing the time varying signal is transmitted over a bus to a processing system. In step 210, a plurality of packets which define one or more data items are received. The number of packets received and/or the length of the interval during which they are received depends on the utilization of the bus.

Typically, a plurality of packets defining at least one item is received. In one embodiment, the data item is represented by a fixed number of packets; however, in other embodiments, packet boundaries are defined by a data header, footer, or an accompanying control packet. One example of a data item is a frame of video information in which a plurality of pixels are represented by multi-bit quantities transmitted in each packet.

In one case, data packets and items of a known size are received for a known interval before any data transfer analysis is performed. In this case, a timer or counter triggers the execution of step 215 which determines the number of items or packets received in the interval. Since the data item size and interval are known, the count of the number of data items is an indication of the data transfer rate and thus the allocated bandwidth.

Either the number of packets or the number of items may be tracked when there is a fixed number of packets per item. Typically, since there is a smaller number of items transmitted, it is be preferable to track an item count. For example, if a sub-sampling or averaging technique represents each motion video frame with a fixed number of packets, only the number of frames needs to be tracked.

In another embodiment where only the packet or item size is known, the data transfer rate is determined in step 220. This situation occurs when a certain number of packets or items triggers a data rate analysis, and a timer tracks the elapsed time during which the data is received. Once the interval is determined from the timer, the allocated bandwidth can be calculated. One example of this type of arrangement is where a data transfer rate analysis occurs after receiving a particular number of video frames.

The remaining possibility is that neither the item size nor the interval is known. This occurs where a compression technique results in each data item potentially comprising a different number of packets. In this scenario, either a header, footer, or a control packet demarcates frame boundaries. As shown in step 225, a counter or a timer determines the period required to receive the one or more items. Next, a packet or an item count is combined with the timer information to determine the allocated bandwidth in step 230.

Thus, the allocated bandwidth, or a value representative thereof, is determined by either step 215, 220 or 230. This allocated bandwidth is then compared to an expected bandwidth in step 232. The comparison determines whether the amount of data received equals or is less than that expected.

After this comparison, adjustments are made in step 235 to efficiently utilize the available communication channel. The bandwidth evaluation, comparison, and adjustment process can be performed at the packet level, multiple packet level, item level, or multiple item level. That is, new calculations of the allocated bandwidth may be performed at different intervals depending on how quickly adjustment desired. Lower frequency adjustments may be desirable where the effects will be directly experienced by a user. For example, a slow adjustment rate (e.g. one per seconds) is generally preferred for motion video in order to provide a reasonably stable image for the viewer. If the transfer rate or quality level is not directly relayed to the user, rapid adjustment may be preferable in order to maximize bandwidth utilization.

Accordingly, an adjustment may be made in step 235 once the proper number of packets or items have been received. This step may not be necessary if the allocated bandwidth is sufficient for the representation used to transfer the time varying signal. On the other hand, a more bandwidth intensive representation of the time varying signal may be chosen if the bus has consistently provided sufficient bandwidth.

When an adjustment is needed, several types of alterations to the requested digital representation may be made. For example, the quality level may be reduced by any sub-sampling or data elimination technique which reduces the number of bits per item. Reducing the number of bits per item can also be accomplished using any traditional compression or variable compression technique. An averaging technique could also be used to represent the input in a more compact format. Alternately, the number of items per second (e.g. a frame rate) could be reduced.

Where such an adjustment is performed, a new data format is specified when data is requested in step 240. The source of the time varying signal responds with data in the appropriate new format, and the requesting bus agent performs the appropriate complementary processing in the receiving step 210.

Figure 3:
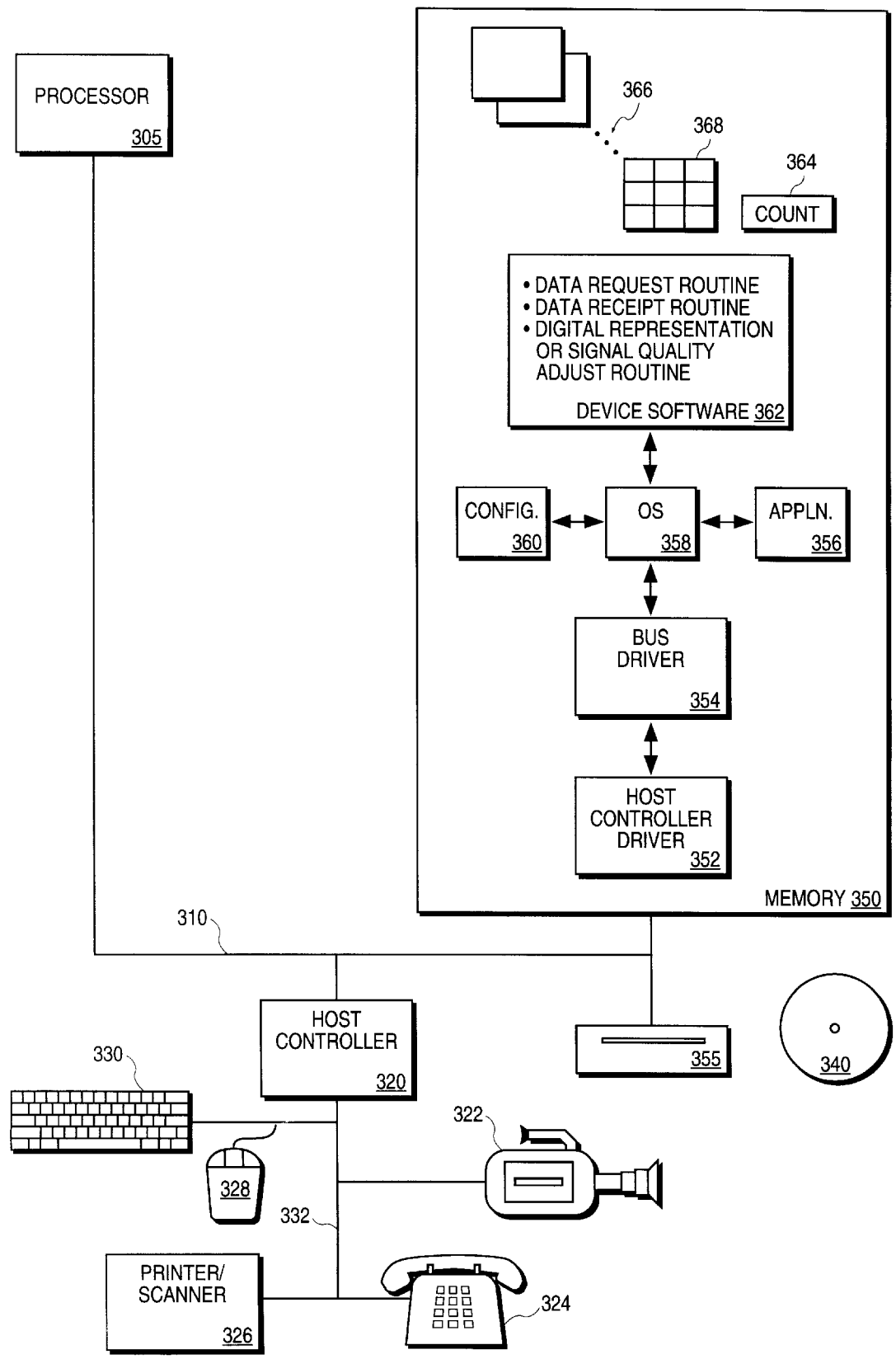
FIG. 3 illustrates a system which performs video processing according to the present invention.

An example of a processing system which implements a method of the present invention is illustrated in FIG. 3. Alternate systems may transmit other signals or may communicate with signal sources through networks or other sets of shared signal lines instead of a bus. In the illustrated system, a video source, video camera 322, consumes a varying bandwidth on a bus 332 depending on the demands of other devices on the bus 332. In one specific case, the bus 332 is a Universal Serial Bus (USB), and the video data is transmitted using the bulk transfer mode. The USB protocols are described in the Universal Serial Bus Specification Revision 1.0, Jan. 16, 1996, available from Intel Corporation of Santa Clara, Calif.

The present invention is not at all limited to a USB implementation. One similar proposed bus protocol which may be used in a system implementing the present invention is the Fire Wire standard which is under development by the IEEE P1394 project. In fact, any communication line which allows utilization dependent bus allocations can employ advantageously the present invention. Consequently, the bus controller may vary from a local bus controller to a network or communications interface.

The Universal Serial Bus is a shared bus architecture which transfers frames of data one millisecond long. Each USE data transfer frame includes as many as four different types of packets. A host controller 320 provides a control packet which transfers set-up, data, or status information to devices on the bus 332. An interrupt packet allows devices to be periodically polled and allows loss-less data delivery. The isochronous mode of transfer reserves a guaranteed bandwidth and delivers data in a guaranteed amount of time. Finally, a bulk mode provides loss-less data delivery, but the bandwidth of the transfer is not guaranteed because bulk packets fill in otherwise idle bandwidth on the bus.

Absent the digital representation adjustment of the present invention, use of the bulk transfer protocol to transfer video would result in an uncontrolled video display. In other words, the processing system would be unable to control the rate at which video frames are received when other devices compete for the bus 332. Using the present invention, a constant frame rate can be achieved because the system dynamically adjusts to bus loads.

As shown in FIG. 3, some devices competing for access to the bus 332 include a telephonic interface device 324, a printer or a scanner 326, a mouse 328, and a keyboard 330. Bus accesses by any of these devices can impact the bandwidth available for bulk transfers by the video camera 322.

In the processing system of FIG. 3, the host controller 320 and a processor 305 are coupled to a processor bus 310. The system includes a media reading device 335 such as a disk drive or a CD ROM drive. Also often used with this system is a computer readable medium 340 which in some embodiments contains software prior to its being stored permanently on a hard drive or read into a memory 350.

The memory 350 is also coupled to the processor bus 310 and may further include decoding or other traditional memory interface logic. During system operation several routines comprising device software 362 are loaded into memory 350 from the computer readable medium 340 or a hard drive (not shown).

The device software 362 includes a data request routine, a data receipt routine, and a digital representation or quality adjustment routine. The memory 350 contains well known configuration routines 360 which configure devices attached to the bus 332. The memory also contains an operating system 358 and an application 356 which requests data via the operating system 358. A bus driver 354 understands the protocols of the bus 332 and interfaces with a host controller driver 352.

The bus driver 354 includes client services (i.e. routines tailored to the devices on bus 332), bus management routines, and data transfer routines which pass data packets from appropriate devices on the bus 332 to their respective device software. The host controller driver 352 then interfaces with the hardware of the host controller 320. The host controller driver 352 handles tasks such as queue, schedule, and controller management.

While various operations are functionally grouped into bus driver 354, host controller driver 352, operating system 358, device software 362, etc., these layers may not in all cases be clearly separated. This embodiment of the present invention only requires an appropriate mechanism to request available bus bandwidth from the host controller 320, and to convey control information to the video camera 322.

Figure 4:
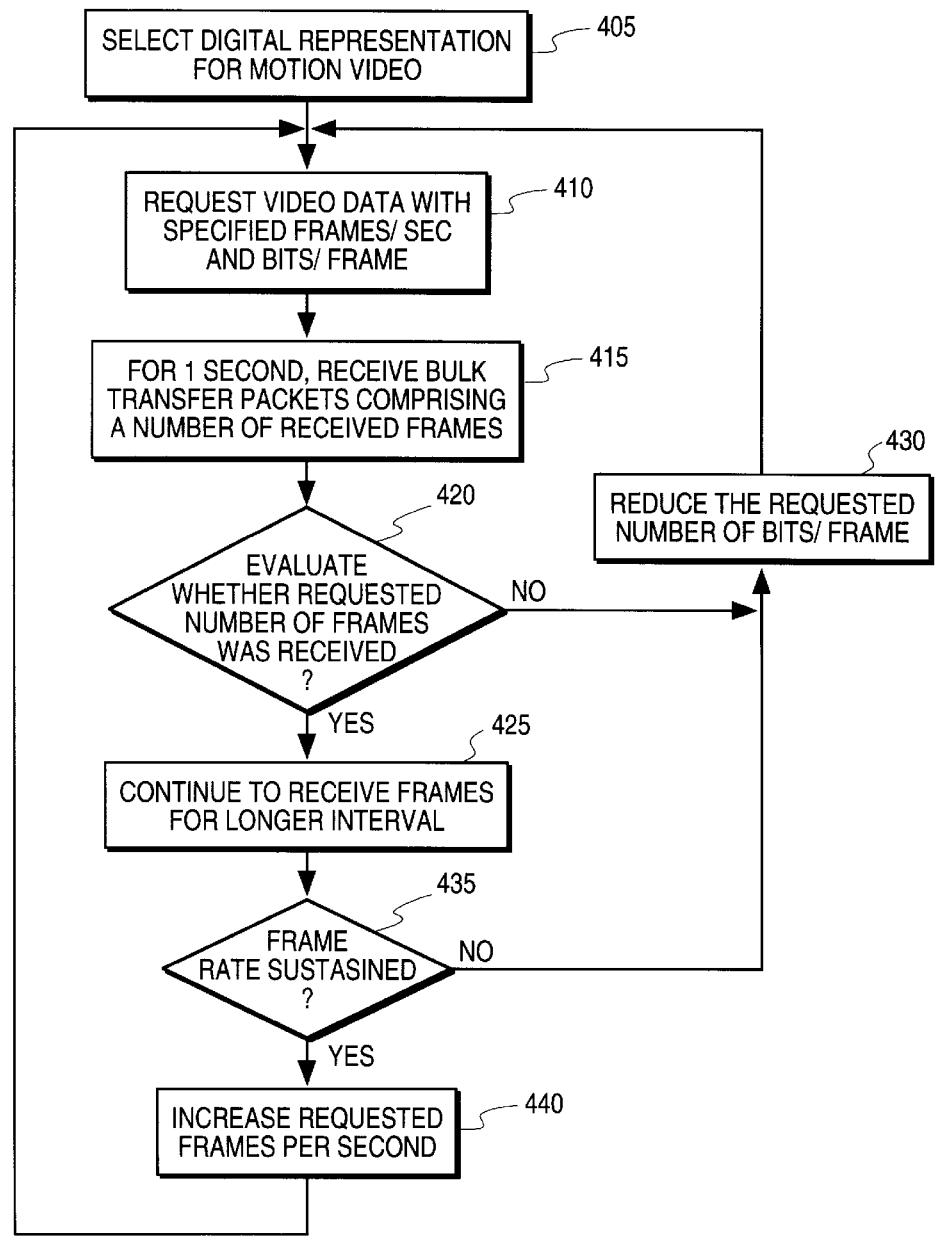
FIG. 4 is a flowchart illustrating one method of the present invention used for video processing in the system of FIG. 3.

The application 356 selects a digital representation as shown in step 405 of FIG. 4. The representation includes characteristics such as picture or frame size, frame rate, and a quality or resolution level. Alternately, device software can select default values or otherwise select some or all of these characteristics.

Depending on the digital representation or compression technique chosen, the number of bits per frame may be an approximate value. Where a sub-sampling or averaging technique is used, a known number of bits is typically received for each frame. On the other hand, if a compression algorithm is used, the number of bits received in each frame may vary depending on the video data. The present invention can be employed where at least an approximate number of bits per frame is known for a particular compression level. Without knowing at least approximately how many bits per frame are expected in a particular representation, the system is unable to adjust the representation to maximally utilize the bandwidth available on the bus.

Data with the selected characteristics is then requested in step 410. To make this request, the data request routine cooperates with the operating system 358 to initially open an end point at the video camera 322, thereby establishing a communication link between the video camera 322 and the application 356. The data request routine of the device software 362 then requests data with a specified number of frames per second and bits per frame.

In an embodiment utilizing the Universal Serial Bus, a control packet sent to the video camera via the host controller 320 indicates desired sub-sampling and frame rates. The video camera 322 performs sub-sampling of red, green, and blue color components of the digital image as specified by the control packet. Adjustment of the number of bits per frame is thus accomplished by changing the sub-sampling rate for one or more of the color components. Alternately, a pixel averaging technique could also be used to reduce the number of bits per frame required to transmit a digital image.

In the USB based embodiment, the video camera 322 requests bulk transfer packets from the host controller 320. As long as the keyboard 330, mouse 328, and printer or scanner 326 are not monopolizing the bus 332, the host controller 320 sends tokens to the video camera 322 requesting bulk transfer packets. The video camera 322 responds with bulk packets containing video data. The packets are received over a designated interval (e.g. one second) as shown in step 415 of FIG. 4.

A plurality of packets 368 form a series of frames 366 stored in the memory 350. Typically, the frames or packets are counted as they are received, and the count 364 is also stored in the memory 350. As a part of receiving the video data, any alteration of an image performed by the camera must be undone prior to display of the image. In the case where sub-sampling is performed, the missing pixels can be approximated using averaging, interpolation, or replication. Where more elaborate compression is performed at the camera, a complimentary process must be undertaken prior to image display in the processing system.

After receiving the series of frames 366 during the known time period, the count 364 is compared to an expected number of frames per second. This is shown in step 420 where the device software 362 evaluates whether the expected data transfer rate was achieved. An interval of one second is used in the example primarily to assure some degree of image stability. A shorter or longer period could elapse prior to evaluation of the data transfer rate depending on the particular time varying signal transmitted and the intended use of the signal by the system.

If less than the requested number of frames was received, insufficient bandwidth is available on the bus 332 for the requested quality level. The appropriate response to this bandwidth shortage is to reduce the number of bits per frame requested as shown in step 430. In this case it may be necessary to drop or repeat frames due to insufficient data. It is preferred to maintain a given rate of frames per second and adjust the quality at that rate; however, alternate embodiments may alter the digital representation of the motion video by adjusting the number of frames per second or by altering both the representation of each image and the number of frames per second. In any case, after a new desired digital representation is chosen, an appropriate request is forwarded to the video camera 322 in step 410.

In the case where the requested data transfer rate is achieved, the image should remain stable unless other devices increase their bus usage. This stability is desirable as a contrast to the instability of dropped frames resulting from incomplete transfers. Thus, overall image stability benefits from the requested bandwidth being increased more slowly than it is decreased. A more gradual increase is accomplished, as shown in step 425, by continuing to receive frames for a longer interval (e.g. five seconds).

During the longer interval, the frame rate is continuously monitored. If other devices on the bus 332 encroach on the bulk bandwidth being used by the video camera 322, the representation of the video signal may need to be changed. For example, if the system begins a transfer of data involving the printer or scanner 326, the requested digital representation of the motion video may need to be altered so less bandwidth is required. If the requested frame rate is not sustained, the method returns to step 430 where the requested number of bits per frame is reduced. If the requested frame rate is maintained on average for the entire longer interval, step 440 is executed after step 435, and the requested frame rate is increased. In either case data is subsequently requested in step 410, and the transmission of the motion video is sustained, though perhaps at a different quality level.

More elaborate algorithms may be used to govern when the requested bandwidth is increased and decreased to improve long term image stability. For example, initial larger adjustments may be followed by smaller incremental adjustments to prevent overshoot of the actual available bandwidth. Also, if a sufficiently high bandwidth steady state is achieved, adjustments may be halted until the available bandwidth decreases. Such algorithms can employ known control theory concepts to smoothly approach the available bandwidth value.

Thus, the present invention takes advantage of available bus bandwidth by dynamically adjusting data rates. This allows sustained communication of a time varying signal through a bus with varying available bandwidth via changes in signal representation. These techniques may appropriately be used to maintain video frame throughput in a variety of buses or other signal lines. While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art upon studying this disclosure.

What is claimed is:

1. A method of adaptively transferring a time varying signal, the method comprising the steps of:

(a) transferring a first number of data elements representing the time varying signal by a requested digital representation during a first time period;

(b) determining an allocated bandwidth value representing a data transfer rate achieved in transferring the first number of data elements; and (c) adjusting the requested digital representation according to a comparison of the allocated bandwidth value to an expected bandwidth value so that a different number of data elements per unit of time represent the time varying signal.

2. The method of claim 1 wherein each data element has a known size, the first time period is a known time period, and wherein step (b) further comprises the step of:
   (i) determining the first number of data elements received during the first time period.

3. The method of claim 1 wherein each data element has a known size, and wherein step (b) further comprises the step of:
   (i) determining the first time period necessary to transfer the first number of data elements.

4. The method of claim 1 wherein step (b) further comprises the steps of:
   (i) determining an item interval during which at least one item of data is received, each item of data being represented by a subset of the first number of data elements; and
   (ii) determining the allocated bandwidth using the item interval and a total number of data elements in the subset representing the at least one item.

5. A method of sustaining communication of a time varying signal over a bus, the method comprising the steps of:
   (a) requesting data representing the time varying signal at a requested quality level;
   (b) receiving the data representing the time varying signal;
   (c) determining a data delivery rate at which the data was received;
   (d) adjusting the requested quality level to an adjusted quality level according to a comparison of the data delivery rate to an expected delivery rate, the adjusted quality level requiring a different number of bits of data per unit time to represent the time varying signal; and
   (e) requesting additional data at the adjusted quality level.

6. The method of claim 5 wherein step (b) further comprises the step of:
   (i) receiving a plurality of data packets within a first interval.

7. The method of claim 6 wherein step (c) further comprises the step of:
   (i) determining a total number of data packets received during the first interval.

8. The method of claim 5 wherein the data comprises at least one data item received during a first interval, each data item having a known data item size, and wherein step (c) further comprises the step of:
   (i) calculating the data delivery rate using the known data item size and the first interval.

9. The method of claim 8 wherein each of the at least one data item comprises a video frame, the first interval comprises one second, and the data delivery rate is a number of frames per second.

10. The method of claim 9 wherein step (d) further comprises the step of:
    (i) requesting that pixel averaging be performed on a plurality of pixels comprising each video frame.

11. The method of claim 5 wherein step (d) further comprises the step of:
    (i) if the data delivery rate is less than an expected data delivery rate for the requested quality level, then selecting a lower quality level which requires fewer bits of data to represent the time varying signal.

12. The method of claim 5 wherein step (d) further comprises the step of:
    (i) if the data delivery rate is less than an expected data delivery rate for the requested quality level, then decreasing a sampling rate of the time varying signal.

13. A method of transferring motion video from a video source over a bus of a computer system, the method comprising the steps of:
    (a) selecting a digital representation for the motion video, the digital representation defining a requested number of frames per second and a requested number of bits per frame;
    (b) requesting video data from the video source, the video data having a requested bandwidth and format defined by the digital representation;
    (c) receiving a plurality of frames during a first interval;
    (d) evaluating whether the requested number of frames per second was transmitted during the first interval;
    (e) adjusting the requested bandwidth by selecting a different digital representation which alters a quality level of the digital representation based on a comparison of the plurality of frames received during the first interval to the requested number of frames per second.

14. The method of claim 13 wherein the requested number of bits per frame is an approximate number which varies according to the video data.

15. The method of claim 13 wherein step (e) further comprises the step of:
    (i) reducing a quality level of the digital representation if the plurality of frames received during the first interval averages less than the requested number of frames per second.

16. The method of claim 15 wherein step (e) further comprises the step of:
    (ii) increasing the quality level if the plurality of frames received during the first interval averages the requested number of frames per second.

17. The method of claim 16 wherein the step (e)(ii) further comprises the steps of:
    (A) continuing to receive frames for a second interval which is longer than the first interval; and
    (B) increasing the quality level only if the requested number of frames per second is received on average during the entire second interval.

18. The method of claim 15 wherein step (e)(i) further comprises the step of:
    (A) reducing the requested number of bits per frame.

19. The method of claim 15 wherein step (e)(i) further comprises the step of:
    (A) reducing the requested number of frames per second.

20. The method of claim 13 wherein the bus is a universal serial bus which utilizes a bulk transfer protocol, and wherein step (b) further comprises the steps of:
    (i) requesting a sub-sampling rate to control the requested number of bits per frame; and
    (ii) requesting a number of frames per second.

21. The method of claim 20 wherein step (c) further comprises the step of:
    (i) receiving a plurality of bulk transfer packets over the universal serial bus.

22. A system which performs processing of a time varying signal, the system comprising:
    a processor;
    a controller coupled to the processor by a processor bus;
    a source of digital values representing a time varying signal, the source being coupled to the controller;
    a main memory coupled to the processor and the controller, the main memory containing therein:
        a data request routine for requesting digital values representing the time varying signal at a selected quality level;

a data receipt routine;

a plurality of data items received by the data receipt routine;

a value corresponding to a data item count for the plurality of data items;

an adjustment routine for comparing the value to an expected value determined by the selected quality level and for adjusting the selected quality level so that each data item is represented by a different number of digital values if the data item count does not match the expected value.

23. The system of claim 22 wherein the controller is a host controller and the source of digital values representing the time varying signal is coupled to the host controller by a shared bus.

24. The system of claim 23 wherein the source of digital values representing the time varying signal is coupled to the host controller by a universal serial bus, wherein the data request routine sends a control packet to the source indicating the selected quality level, and wherein the data receipt routine receives the time varying signal as a plurality of bulk packets.

25. The system of claim 22 wherein the controller is a network interface controller.

26. An article comprising a machine readable medium containing a program which, when executed by a machine performs:

(a) transferring a first number of data elements representing a time varying signal by a requested digital representation during a first time period;

(b) determining an allocated bandwidth value representing a data transfer rate achieved in transferring the first number of data elements; and (c) adjusting the requested digital representation according to a comparison of the allocated bandwidth value to an expected bandwidth value so that a different number of data elements per unit of time represent the time varying signal.

* * * * *

UNITED STATES PATENT AND TRADEMARK OFFICE
CERTIFICATE OF CORRECTION

PATENT NO.      : 5,848,266
DATED           : December 8, 1998
INVENTOR(S)     : Scheurich It is certified that error appears in the above-identified patent and that said Letters Patent is hereby corrected as shown below:

Column 5,
Line 60, delete "USE" and insert -- USB --.

Signed and Sealed this

Seventeenth Day of June, 2003

JAMES E. ROGAN
*Director of the United States Patent and Trademark Office*